United States Patent
Ogasawara et al.

(10) Patent No.: US 8,543,229 B2
(45) Date of Patent: Sep. 24, 2013

(54) DATA REPRODUCING APPARATUS, DATA REPRODUCING METHOD AND INFORMATION STORING MEDIUM

(75) Inventors: Tsutomu Ogasawara, Kanagawa (JP); Tsunayuki Ohwa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1263 days.

(21) Appl. No.: 12/092,525

(22) PCT Filed: Aug. 21, 2006

(86) PCT No.: PCT/JP2006/316341
§ 371 (c)(1),
(2), (4) Date: Jun. 18, 2008

(87) PCT Pub. No.: WO2007/055058
PCT Pub. Date: May 18, 2007

(65) Prior Publication Data
US 2009/0240358 A1  Sep. 24, 2009

(30) Foreign Application Priority Data
Nov. 9, 2005 (JP) .................................. 2005-324900

(51) Int. Cl.
*G06F 17/00* (2006.01)
(52) U.S. Cl.
USPC .......................................................... 700/94
(58) Field of Classification Search
USPC ............................................................. 700/94
See application file for complete search history.

(56) References Cited

U.S. PATENT DOCUMENTS
2004/0225519 A1* 11/2004 Martin .............................. 705/1

FOREIGN PATENT DOCUMENTS
| JP | 7-14365 | 1/1995 |
| JP | 2000251382 | 9/2000 |
| JP | 2002-114107 | 4/2002 |
| JP | 2002-218363 | 8/2002 |

(Continued)

OTHER PUBLICATIONS
English translation of the International Preliminary Report on Patentability and the Written Opinion of the International Searching Authority dated May 14, 2008, from the corresponding International Application.
Notice of Rejection dated Mar. 31, 2009, from the corresponding Japanese Application.

(Continued)

*Primary Examiner* — Andrew C Flanders
(74) *Attorney, Agent, or Firm* — Katten Muchin Rosenman LLP

(57) ABSTRACT

When a plurality of items of data are sequentially read and reproduced from a data storing means which stores the data, data suited to a user's mood at the moment or a situation is selected to be reproduced without needing any complex operation. A data reproducing apparatus for sequentially reading and reproducing a plurality of items of data from a data storing unit (104) which stores the data includes: a reproduction history storing unit (202) that stores reproduction history including identification information of data at least a part of which has been reproduced; an identification information reading unit (204) that reads the identification information of some or all of the data from the reproduction history storing unit (202); a reproduction characteristic information generating unit (208) that generates, based on the characteristic information of data identified by the read identification information, reproduction characteristic information regarding a predetermined situation; and a reproducing order setting unit (212) that sets a data reproducing order based on the reproduction characteristic information and characteristic information of a part or all of the data stored in the data storing unit (104).

14 Claims, 16 Drawing Sheets

(56) References Cited

FOREIGN PATENT DOCUMENTS

| JP | 2005190640 | 7/2005 |
| JP | 2005521979 | 7/2005 |
| JP | 2005-302081 | 10/2005 |
| JP | 2005276400 | 10/2005 |

OTHER PUBLICATIONS

Notice of Rejection dated Jul. 7, 2009, from the corresponding Japanese Application.
International Search Report dated Nov. 21, 2006 from PCT/JP06/316341.

* cited by examiner

FIG.3

| DATA ID | SONG TITLE | ARTIST NAME | GENRE | OTHER META INFORMATION | PATH TO DATA |
|---|---|---|---|---|---|
| 0001 | MINNA NO UTA | SAS | JPOP | ... | /music/minna.mp3 |
| 0002 | TSUNAMI | SAS | JPOP | ... | /music/tsunami.mp3 |
| | | | | | |
| | | | | | |

FIG.4

| DATA ID | CHEERFUL | GLOOMY | JOYFUL | SAD | UP TEMPO | MIDDLE TEMPO | SLOW TEMPO |
|---------|----------|--------|--------|-----|----------|--------------|------------|
| 0001 | 0 | 1 | 0 | 1 | 0 | 1 | 0 |
| 0002 | 1 | 0 | 1 | 0 | 1 | 0 | 0 |
| 0003 | 0 | 1 | 0 | 1 | 0 | 0 | 1 |
| 0004 | 1 | 0 | 1 | 0 | 0 | 1 | 0 |

| DATA ID |
|---------|
| 0001 |
| 0004 |
| 0002 |
| 0004 |
| 0003 |
| 0001 |
| 0001 |
| 0001 |
| 0004 |
| 0001 |
| 0002 |
| 0002 |

(b)

| DATA ID | REPRODUCTION START TIME | EVALUATION VALUE |
|---------|------------------------|------------------|
| 0001 | 2005.7.7 10:00:00 | -1 |
| 0004 | 2005.7.7 9:55:50 | 2 |
| 0002 | 2005.7.7 9:50:20 | 1 |
| 0004 | 2005.7.7 9:50:00 | 1 |
| 0003 | 2005.7.1 23:00:00 | 2 |
| 0001 | 2005.7.1 22:55:50 | 1 |
| 0001 | 2005.7.1 22:55:30 | 1 |
| 0001 | 2005.7.1 22:50:00 | 1 |
| 0004 | 2005.6.30 17:10:00 | 1 |
| 0001 | 2005.6.30 17:05:50 | 1 |
| 0002 | 2005.6.30 9:55:30 | 1 |
| 0002 | 2005.6.30 9:50:00 | 1 |

| $C_T$ | CHEERFUL | GLOOMY | JOYFUL | SAD | UP TEMPO | MIDDLE TEMPO | SLOW TEMPO |
|---|---|---|---|---|---|---|---|
| | 3 | 1 | 3 | 1 | 1 | 3 | 0 |

(b)

| $C_T$ | CHEERFUL | GLOOMY | JOYFUL | SAD | UP TEMPO | MIDDLE TEMPO | SLOW TEMPO |
|---|---|---|---|---|---|---|---|
| | 4 | -1 | 4 | -1 | 1 | 2 | 0 |

FIG. 15

| DATA ID | REPRODUCTION START TIME | EVALUATION VALUE |
|---|---|---|
| 0001 | 2005.7.7 10:00:00 | -1 |
| 0004 | 2005.7.7 9:55:50 | 2 |
| 0002 | 2005.7.7 9:50:20 | 1 |
| 0004 | 2005.7.7 9:50:00 | 1 |
| 0003 | 2005.7.1 23:00:00 | 2 |
| 0001 | 2005.7.1 22:55:50 | 1 |
| 0001 | 2005.7.1 22:55:30 | 1 |
| 0001 | 2005.7.1 22:50:00 | 1 |
| 0004 | 2005.6.30 17:10:00 | 1 |
| 0001 | 2005.6.30 17:05:50 | 1 |
| 0002 | 2005.6.30 9:55:30 | 1 |
| 0002 | 2005.6.30 9:50:00 | 1 |

MORNING, FAIR, MEDIUM SPEED

MORNING, FAIR, LOW SPEED

NIGHT, CLOUDY, HIGH SPEED

EVENING, RAINY MEDIUM SPEED

MORNING, CLOUDY, MEDIUM SPEED

FIG.16

| DATA ID | TIME OF DAY | | | | | WEATHER | | | ... | MOVING SPEED | | |
|---|---|---|---|---|---|---|---|---|---|---|---|---|
| | MORNING | AFTERNOON | EVENING | NIGHT | MIDNIGHT | FAIR | CLOUDY | RAINY | ... | LOW SPEED | MEDIUM SPEED | HIGH SPEED |
| 0001 | -1 | 0 | 1 | 3 | 0 | -1 | 3 | 1 | ... | 0 | 0 | 3 |
| 0002 | 3 | 0 | 0 | 0 | 0 | 1 | 2 | 0 | ... | 1 | 2 | 0 |
| 0003 | 0 | 0 | 0 | 2 | 0 | 0 | 2 | 0 | ... | 0 | 0 | 2 |
| 0004 | 3 | 0 | 1 | 0 | 0 | 3 | 0 | 1 | ... | 1 | 3 | 0 |

FIG.17

| DATA ID | MOST RECENTLY | | TIME OF DAY (MORNING) | | WEATHER (FAIR) | | ... | MOVING SPEED (MEDIUM SPEED) | |
|---|---|---|---|---|---|---|---|---|---|
| 0001 | $a_1$ | -1 | $b_1$ | -1 | $c_1$ | -1 | ... | $m_1$ | 0 |
| 0002 | $a_2$ | 1 | $b_2$ | 3 | $c_2$ | 1 | | $m_2$ | 2 |
| 0003 | $a_3$ | 0 | $b_3$ | 0 | $c_3$ | 0 | | $m_3$ | 0 |
| 0004 | $a_4$ | 3 | $b_4$ | 3 | $c_4$ | 3 | | $m_4$ | 3 |

DATA REPRODUCING APPARATUS, DATA REPRODUCING METHOD AND INFORMATION STORING MEDIUM

TECHNICAL FIELD

The present invention relates to a data reproducing apparatus, a data reproducing method, and an information storing medium, and more particularly, to a data reproducing apparatus, a data reproducing method, and an information storing medium for sequentially reading a plurality of items of data from data storing means which stores the data, to reproduce the data.

BACKGROUND ART

There has recently been a remarkable advance in technology regarding compression of music data, moving image data, or the like (hereinafter, referred to as contents data) and an achievement of a large capacity of a compact hard disk or a flash memory. This advance has also brought about development of a contents data reproducing apparatus which selects, among a great volume of contents data recorded in the hard disk or the flash memory, necessary data to be reproduced. The hard disk or the flash memory has features that the amount of data to be recorded is much greater compared with other recording media such as a cassette, an MD, and a CD, and that high-speed random access is allowed to arbitrary data. Utilizing those features, for example, a music data reproducing apparatus such as a stationary music player or portable music player, or a car audio having a function of shuffle reproduction (random reproduction) of music data or programmed reproduction in which a reproducing order of music data is specified, has come into wide use.

DISCLOSURE OF THE INVENTION

Problems to be Solved by the Invention

Generally, it is often the case that, when reproducing music data by the music data reproducing apparatus as described above, a user switches music to be reproduced as necessary, or programs a favorite reproducing order not according to a recorded order of the music data but according to a situation such as a mood at the moment, time, weather, or a season. However, this reproducing method necessitates an operation of selecting music of interest from a large volume of music data.

On the other hand, in the case of shuffle reproduction, the aforementioned operation is not necessary. By selecting only a specific artist or a genre, the music data reproducing apparatus is enabled to randomly select music to be reproduced. However, because music data to be reproduced are selected with almost the same probability, there is a problem that music suited to user's mood at the moment or a situation is not always reproduced.

The present invention has been made to solve the conventional problems described above, and it is an object of the invention to provide a data reproducing apparatus, a data reproducing/receiving method, and an information storing medium which can select and reproduce, when sequentially reproducing a plurality of items of data from data storing means which stores the data, data suited to a user's mood at the moment or a situation without needing any complex operation.

Means for Solving the Problem

In order to achieve the above mentioned object, a data reproducing apparatus according to the present invention includes reproducing means for sequentially reading and reproducing a plurality of items of data from data storing means which stores the data, and is characterized by including: reproduction history storing means for storing reproduction history containing identification information of the data at least a part of which has been reproduced by the reproducing means; identification information reading means for reading the identification information of some or all of the data from the reproduction history storing means; reproduction characteristic information generating means for generating reproduction characteristic information regarding a predetermined situation based on characteristic information of data identified by the identification information read by the identification information reading means; and reproducing order setting means for setting a reproducing order of reading and reproducing the data from the data storing means by the reproducing means based on the reproduction characteristic information generated by the reproduction characteristic information generating means and characteristic information of some or all of the data stored in the data storing means.

According to the present invention, when the plurality of items of data are sequentially read from the data storing means which stores the data to be reproduced, without needing any complex operation, data suited to a predetermined situation can be selected to be reproduced.

According to an aspect of the present invention, the identification information reading means reads the identification information of some data reproduced in a current situation from the reproduction history storing means. The reproduction history may further contain time information regarding reproduction of the data for each item, of the identification information, and the identification information reading means may read the identification information of some of the data from the reproduction history storing means based on current time. The identification information reading means may read identification information of some of the data from the reproduction history storing means based on the reproducing order of the data identified by the identification information contained in the reproduction history. Thus, data similar in characteristics to data reproduced in a current situation can be selected, and data suited to the current situation can be selected to be reproduced without needing any complex operation.

Further, according to an aspect of the present invention, the reproduction history further contains an evaluation value in association with each item of the identification information, and the reproduction characteristic information generating means, based on the evaluation value associated with the identification information read by the identification information reading means, weights and combines items of characteristic information of the data to generate the reproduction characteristic information. The reproduction history may contain an evaluation value for each item of situation information indicating a situation during reproduction of the data in association with each item of the identification information, and the reproduction characteristic information generating means, based on the evaluation value for situation information indicating a current situation associated with the identification information read from the identification information reading means, may weight and combine the items of characteristic information of the data to generate the reproduction characteristic information. Thus, data similar in characteristics to data reproduced in a predetermined situation can be selected based on an evaluation value for each item of the situation information, and data suited to the predetermined situation can be selected to be reproduced without needing any complex operation.

Further, according to an aspect of the present invention, the evaluation value is set based on a reproduction state of the data identified by the characteristic information read by the characteristic information reading means. Alternatively, the evaluation value may be set based on whether reproduction of the data identified by the characteristic information read by the characteristic information reading means has been completed. Further, the evaluation value may be set based on whether reproduction of the data identified by the characteristic information read by the characteristic information reading means has been repeated. Further, the evaluation value may be set based on whether reproduction of the data identified by the characteristic information read by the characteristic information reading means has been skipped midway. Accordingly, each data is automatically evaluated without imposing a special operation other than normal reproduction control on a user. Thus, data similar in characteristics to data reproduced in a predetermined situation can be selected based on an evaluation value according to a reproduction state, and data suited to the predetermined situation can be selected to be reproduced without needing any complex operation.

Further, according to an aspect of the present invention, the data reproducing apparatus further includes operating means for detecting a predetermined priority setting operation for a specific piece of the data from a user. The evaluation value is set according to whether the operating means has detected the priority setting operation from the user. The specific piece of the data may be data currently reproduced by the reproducing means. Thus, data similar in characteristics to data reproduced in a predetermined situation can be selected based on an evaluation value explicitly added by a user, and data suited to the predetermined situation can be selected to be reproduced without needing any complex operation.

Further, according to an aspect of the present invention, the reproducing order setting means obtains predetermined correlation information indicating a correlation between the reproduction characteristic information generated by the reproduction characteristic information generating means and characteristic information of some or all of the data stored in the data storing means, and sets the reproducing order of the data based on the correlation information. Thus, data similar in characteristics to data reproduced in a predetermined situation can be selected based on the correlation information.

Further, according to an aspect of the present invention, the reproducing order setting means sets the reproducing order of the data selected according to a presence or absence of reproduction at and after a predetermined time. Thus, for example, data having similar characteristics can be selected from only data which satisfy conditions of not having being reproduced within the last week.

Further, a data reproducing method according to the present invention includes a reproducing step of sequentially reading and reproducing a plurality of items of data from data storing means which stores the data, and is characterized by including: a step of controlling reproduction history storing means to store reproduction history containing identification information of the data at least a part of which has been reproduced in the reproducing step; an identification information reading step of reading the identification information of some or all of the data from the reproduction history storing means; a reproduction characteristic information generating step of generating reproduction characteristic information regarding a predetermined situation from characteristic information of data identified by the identification information read in the identification information reading step; and a reproducing order setting step of setting a reproducing order of reading and reproducing the data from the data storing means in the reproducing step based on the reproduction characteristic information generated in the reproduction characteristic information generating step and characteristic information of some or all of the data stored in the data storing means.

Further, a program according to the present invention is a program which controls a computer to function as a data reproducing apparatus including reproducing means for sequentially reading and reproducing a plurality of items of data from data storing means which stores the data, and controls the computer to function as: reproduction history storing means for storing reproduction history containing identification information of the data at least a part of which has been reproduced by the reproducing means; identification information reading means for reading the identification information of some or all of the data from the reproduction history storing means; reproduction characteristic information generating means for generating reproduction characteristic information regarding a predetermined situation from characteristic information of data identified by the identification information read by the identification information reading means; and reproducing order setting means for setting a reproducing order of reading and reproducing the data from the data storing means by the reproducing means based on the reproduction characteristic information generated by the reproduction characteristic information generating means and the characteristic information of some or all of the data stored in the data storing means.

Further, an information storing medium according to the present invention is a computer-readable information storing medium which stores the program. As the information storing medium, for example, a magnetic tape, a flexible disk, a hard disk, a CD-ROM, an MO, an MD, a DVD-ROM, or an IC card can be used.

BRIEF DESCRIPTION OF THE DRAWINGS

FIG. 3 is a diagram illustrating an example of meta information of music data stored in a data managing unit.

FIG. 4 is a diagram illustrating an example of characteristic information of the music data stored in the data managing unit.

FIGS. 5A and 5B are diagrams illustrating examples of reproduction history stored in a reproduction history storing unit.

FIGS. 6A and 6B are diagrams illustrating reproduction characteristic information generated by a reproduction characteristic information generating unit.

FIG. 15 is a diagram illustrating an example of reproduction history stored in a reproduction history storing unit.

FIG. 16 is a diagram illustrating an example of reproduction history (accumulated evaluation value for each situation information) stored in the reproduction history storing unit.

FIG. 17 is a diagram illustrating an example of an evaluation value of data ID corresponding to a current situation (morning, fair, and medium speed).

BEST MODE FOR CARRYING OUT THE INVENTION

Figure 1:
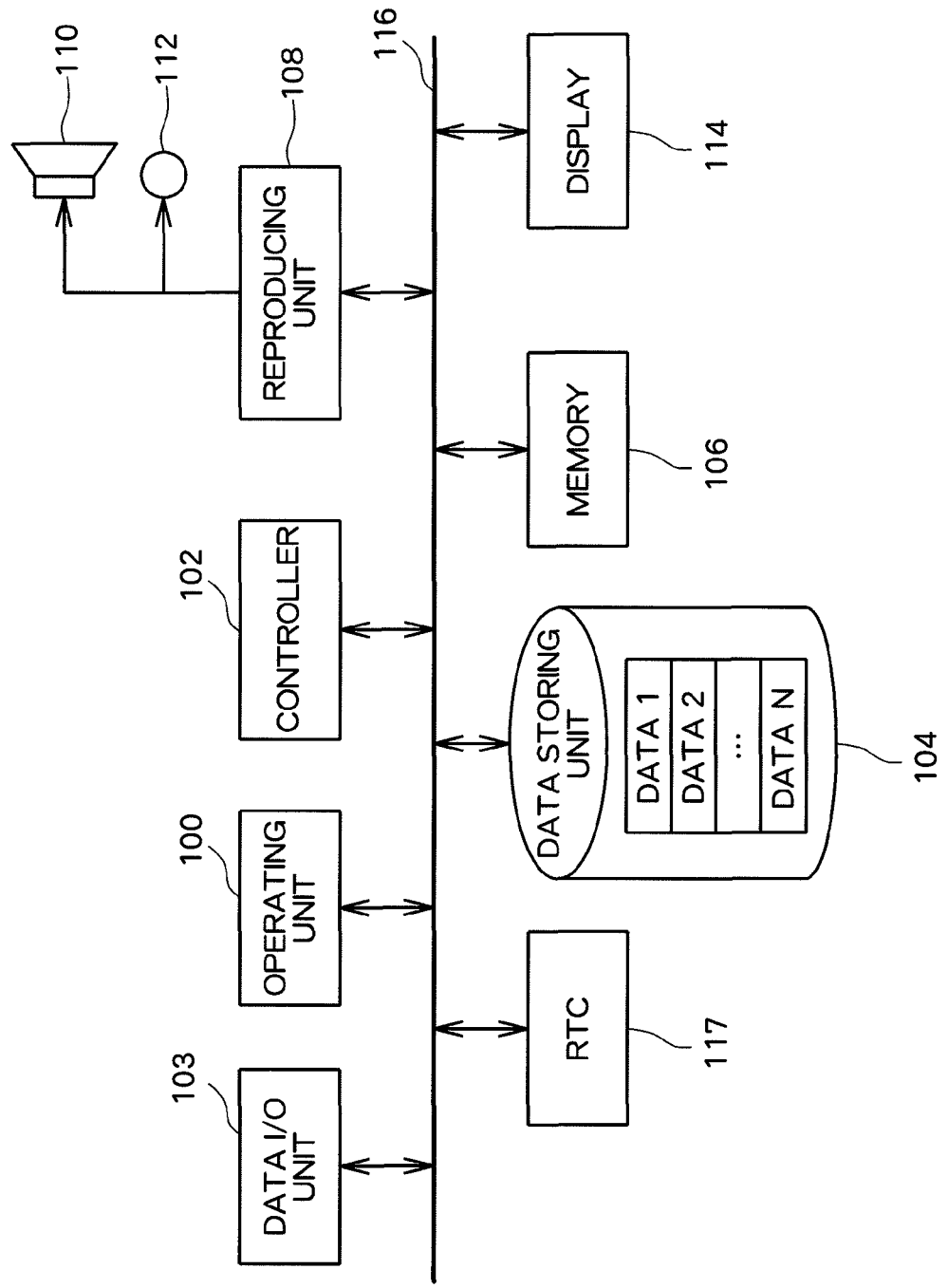
FIG. 1 is a diagram illustrating a configuration of a data reproducing apparatus according to a first embodiment of the present invention.

A mode for carrying out the present invention (hereinafter, referred to as embodiment) will be described below referring to the drawings. A data reproducing apparatus of the present invention can be applied to any type of reproducible data such as audio, a moving image, a static image, or a character. However, for convenience of explanation, the embodiment will be described by taking an example of a data reproducing apparatus dedicated to music data.

Some pieces of music that a user has listened to most recently (hereinafter, referred to as music reproduced most recently) are considered as music well suited to a situation at the moment for the user. Accordingly, music similar in musical characteristics to the music reproduced most recently is highly likely to be music suited to the situation at the moment. Similarly, among pieces of music that the user has listened to in the past, music frequently reproduced under an environment similar to the situation at the moment (hereinafter, referred to as music reproduced under the same environment) may be music suited to the situation at the moment for the user. Thus, music similar in musical characteristics to the music reproduced under the same environment is highly likely to be music suited to the situation at the moment.

A music data reproducing apparatus of this embodiment is, for example, a stationary music player or a portable music player or a car audio, and is characterized by including a "recommended shuffle reproduction" function based on the aforementioned concept. In other words, the music data reproducing apparatus of this embodiment is characterized by including a function of automatically selecting, among a number of data stored in the apparatus, music data similar in musical characteristics to music reproduced most recently or music reproduced under the same environment to preferentially reproduce the selected music as music suited to a situation at the moment.

First Embodiment

Figure 2:
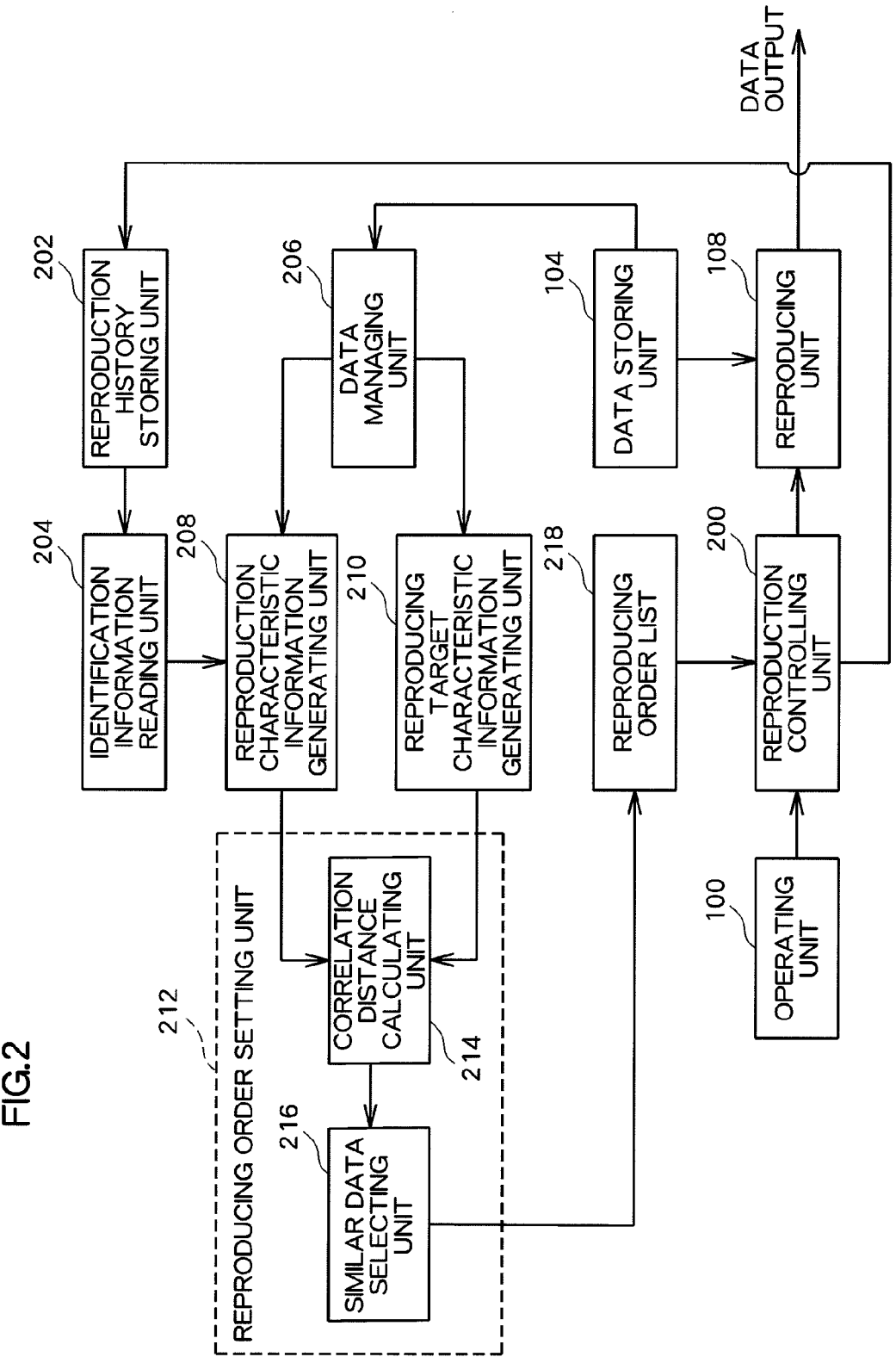
FIG. 2 is a block diagram of the data reproducing apparatus according to the first embodiment of the present invention.

FIG. 1 is a diagram illustrating a configuration of a data reproducing apparatus according to a first embodiment according to the present invention. FIG. 2 is a block diagram illustrating the data reproducing apparatus according to the first embodiment of the present invention.

The music data reproducing apparatus of the first embodiment includes an operating unit 100, a controller 102, a data I/O unit 103, a data storing unit 104, a memory 106, a reproducing unit 108, a loudspeaker 110, an audio output terminal 112, a display 114, a bus 116, and a real time clock (RTC) 117.

The operating unit 100 includes a button, a lever, a dial, and a touch pad, and receives an entry of various items of information or an instruction regarding reproduction control from a user.

The controller 102 includes a reproduction controlling unit 200, an identification information reading unit 204, a reproduction characteristic information generating unit 208, a reproducing target characteristic information generating unit 210, and a reproducing order setting unit 212. The controller 102 selects music data stored in the data storing unit 104 according to an instruction entered from the user via the operating unit 100, and gives an instruction to the reproducing unit 108 via the bus 116 to carry out reproduction control (reproducing, skipping, stopping, or the like) of the music data. The controller 102, for example, switches various reproducing modes (repeat, programmed reproduction, shuffle reproduction, or the like), or outputs various items of information such as a song title for the music data to the display 114.

The data I/O unit 103 is connected to a personal computer which stores music data, or the like, via a universal serial bus (USB) or the like to relay fetching of the music data from the personal computer or the like to the music data reproducing apparatus.

The data storing unit 104 stores a plurality of pieces of music data entered via the data I/O unit 103 and the bus 116.

The memory 106 includes a reproduction history storing unit 202, a data managing unit 206, and a reproducing order list 218. The memory 106 temporarily stores various items of data such as a reproducing order list (play list) or music data reproduction history.

The reproducing unit 108 reproduces the music data entered from the data storing unit 104 via the bus 116 according to an instruction from the controller 102. The loudspeaker 110 outputs a music signal from the reproducing unit 108 to the outside. The audio output terminal 112 is connected to a headset or the like to output the audio signal from the reproducing unit 108 to the headset or the like.

The display 114 displays meta information (song title, artist name, genre, or the like) regarding currently reproduced music data, a reproducing order list of the music data, or the like.

The data managing unit 206 manages various items of meta information of the music data, path information to the music data file of the data storing unit 104, or the like in association with data ID (identification information) of the music data stored in the data storing unit 104. FIG. 3 is a diagram illustrating an example of meta information of music data stored in the data managing unit 206. A part of the other meta information of the drawing contains, for example, characteristic information of the music data. FIG. 4 is a diagram illustrating an example of characteristic information of the music data stored in the data managing unit 206. As shown in this diagram, the characteristic information of the music data indicates musical characteristics of the music data by combining indices of "cheerful, gloomy, joyful, and sad." The characteristic information of the music data may contain information such as an artist name or a genre. The data managing unit 206 has a function as an index of the music data stored in the data storing unit 104. By referring to contents of the data managing unit 206, quick access can be made to specific music data. The contents of the data managing unit 206 are properly updated based on an instruction from the controller 102 for each addition or deletion of music data in the data storing unit 104, or each update of the meta information.

When selecting music data to be reproduced, first, the user operates the operating unit 100 to display a list of all pieces of music data stored in the data storing unit 104 in the display 114. Upon receipt of an instruction to display the list of music data from the operating unit 100, the reproduction controlling unit 200 reads meta information of all pieces of music data from the data managing unit 206, and displays a list of meta information of the music data in the display 114. In this case, the display 114 may display a list of song titles with a scroll bar added so that the song titles can be checked one by one, display a hierarchical structure based on a folder (directory) structure of the data storing unit 104, or display a user interface for enabling selection of desired music by tracing a genre, an artist name, or the like.

Upon selection of the music data to be reproduced by the user, the reproduction controlling unit 200 obtains path information to the music data from the data managing unit 206 based on data ID of the selected music data, and reads the music data from the data storing unit 104 based on the obtained path information to transfer the music data to the reproducing unit 108 via the bus 116.

When the user does not explicitly select any music data to be reproduced, the reproducing order list 218 is generated based on an order of music data stored in the data storing unit 104, or the like. The reproduction controlling unit 200 sequentially obtains corresponding pieces of path information of the music data from the data managing unit 206 according to the order of data ID in the reproducing order list 218, and transfers the music data read from the data storing unit 104 based on the path information to the reproducing unit 108 via the bus 116. In order to specify positions of reproducing target data in the reproducing order list 218, the order of data ID may be updated as occasion demands to always set head data ID as a reproducing target, or a counter (pointer) for indicating a position of data ID to be reproduced, or the like may be further provided.

The reproduction controlling unit 200 instructs the reproducing unit 108 to reproduce the music data, and simultaneously stores data ID of music data for which reproduction has started in the reproduction history storing unit 202. FIGS. 5A and 5B are diagrams illustrating examples of reproduction history stored in the reproduction history storing unit 202. In the example of FIG. 5A, the reproduction history stores data ID in a reproduced order from a lower side. In the example of FIG. 5B, the reproduction history stores data ID in a reproduced order from the lower side, and stores reproduction start time of corresponding music data and an evaluation values indicating user's preference of the music data in association with the data ID. An RTC 117 has a clock function. The reproduction start time stored in the reproduction history is obtained from the RTC 117.

The evaluation value may be added automatically according to a reproduction state of the music data. For example, a rule is set so that positive evaluation is made when the music data are completely reproduced from the start to the end and when the music data are repeatedly reproduced, and negative evaluation is made when reproduction is skipped midway. Accordingly, each music data is automatically evaluated without imposing any special operation other than normal reproduction control on the user. As in a case where a special key is disposed as a favorite key in the operating unit 100, and when the user presses the favorite key, positive evaluation is made for the music data, the user may make explicit evaluation. Input means for setting an arbitrary evaluation value may be disposed in the operating unit 100 and, irrespective of whether the music data is being reproduced, arbitrary music data stored in the data storing unit 104 may be evaluated.

The identification information reading unit 204 reads data ID of some or all of pieces of the music data from the reproduction history storing unit 202, at a time such as immediately before or after switching music to be reproduced, or immediately after updating the reproduction history storing unit 202, or every time a predetermined number of pieces of music are reproduced, or every predetermined period, or the like. For example, in the case of recently generated reproduction history shown in FIG. 5A, three pieces of music (data ID: 0001, 0004, and 0002) from the upper side can be selected as pieces of music reproduced most recently and suited to a current situation. In other words, the identification information reading unit 204 can select music reproduced most recently in a current situation by reading a part of the data ID from the reproduction history storing unit 202 based on the reproducing order of the music data.

In the case of FIG. 5B where the reproduction history contains reproduction start time, for example, pieces of music (data ID: 0001, 0004, 0002, and 0004) reproduced within the past 15 minutes can be selected as pieces of music reproduced most recently. In other words, the identification information reading unit 204 can select music reproduced most recently in the current situation by reading a part of the data ID from the reproduction history storing unit 202 based on current time.

The reproduction characteristic information generating unit 208 obtains corresponding characteristic information from the data managing unit 206 based on a part of the data ID read by the identification information reading unit 204. Then, based on the plurality of items of obtained characteristic information, the reproduction characteristic information generating unit 208 generates an item of characteristic information (hereinafter, referred to as reproduction characteristic information) regarding a predetermined situation. When the data ID read by the identification information reading unit 204 is a data ID of music reproduced most recently as described above, the reproduction characteristic information generated by the reproduction characteristic information generating unit 208 indicates characteristics of music data reproduced in a current situation. In other words, the reproduction characteristic information generated based on characteristic information of music reproduced most recently indicates characteristics of music data suited to the current situation for the user.

The reproduction characteristic information generating unit 208 may combine all the plurality of items of characteristic information with the same weight to generate an item of reproduction characteristic information. In other words, reproduction characteristic information $C_T$ of music data of recently reproduced k pieces of music is obtained by the following Equation (1) where $C_k$ is characteristic information of music data of the k-th music.

[Equation 1]

$$C_T = C_1 + C_2 + \ldots C_k \quad (1)$$

For example, when reproduction characteristic information $C_T$ of four pieces of music (data ID: 0001, 0004, 0002, and 0004) reproduced most recently is obtained based on the reproduction history shown in FIG. 5A and the characteristic information shown in FIG. 4 by Equation (1), a result is as shown in FIG. 6A. It can be understood from the reproduction characteristic information of FIG. 6A that the user prefers "cheerful, joyful, and middle tempo" music in the current situation. A value of each element in the reproduction characteristic information $C_T$ may be an average value obtained by division by a total number of k, and when $C_T$ is regarded as a vector, may be normalized so that a size of the vector is 1.

The reproduction characteristic information generating unit 208 may weight and combine items of characteristic information based on evaluation values added to the music data to generate an item of reproduction characteristic information. In other words, reproduction characteristic information $C_T$ of music data of recently reproduced k pieces of music can be obtained by the following Equation (2) where $C_k$ is characteristic information of music data of the k-th music and $a_k$ is an evaluation value of the music data.

[Equation 2]

$$C_T = C_1 \times a_1 + C_2 \times a_2 + \ldots + C_k \times a_k \quad (2)$$

For example, when reproduction characteristic information $C_T$ of four pieces of music (data ID: 0001, 0004, 0002, and 0004) reproduced most recently is obtained based on the reproduction history shown in FIG. 5B and the characteristic information shown in FIG. 4 by Equation (2), a result is as shown in FIG. 6B. It can be understood from the reproduction characteristic information of FIG. 6B that the user prefers "cheerful, joyful, and middle tempo" music in the current situation. The reproduction characteristic information $C_T$ may be an average value obtained by division by a total number of k, and when $C_T$ is regarded as a vector, may be normalized so that a size of the vector is 1.

Figure 7:
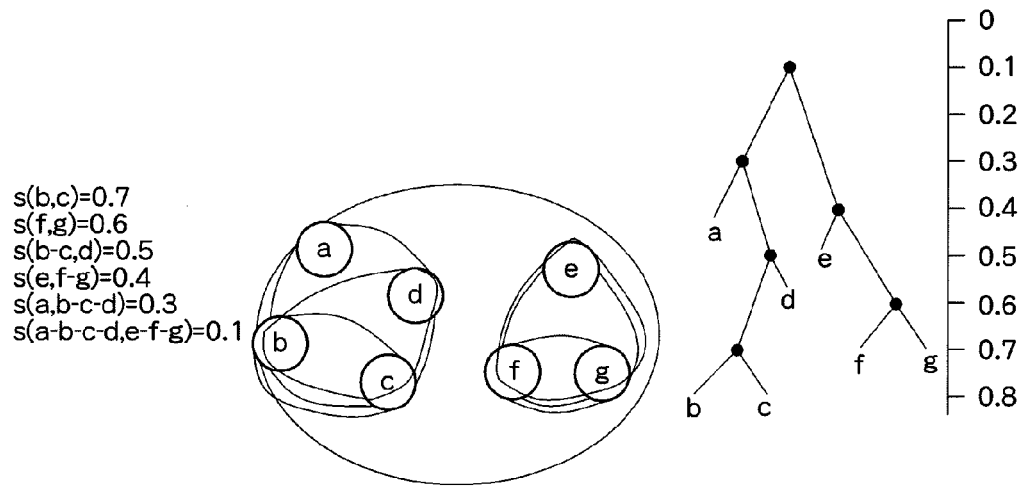
FIG. 7 is a conceptual diagram of an aggregation type clustering algorithm.

The reproducing target characteristic information generating unit 210 sequentially generates items of characteristic information of music data to be included in reproducing targets (hereinafter, referred to as reproducing target characteristic information). In other words, the reproducing target characteristic information generating unit 210 sets characteristic information of music data obtained from the data managing unit 206 as reproducing target characteristic information based on some or all of data ID read from the data storing unit 104. The reproducing target characteristic information generating unit 210 may, by using a method such as ontology or clustering, classify some or all of music data read from the data storing unit 104 into some clusters (groups), and set characteristic information of each cluster as reproducing target characteristic information The ontology describes a concept of each field or a system of terms, while the clustering is a method of grouping data similar in characteristics to one another. FIG. 7 illustrates a conceptual diagram of an aggregation type clustering algorithm. The reproducing target characteristic information generating unit 210 may set characteristic information of music data selected according to a presence or absence of reproduction at and after a predetermined time as reproducing target characteristic information. For example, based on reproduction history of the reproduction history storing unit 202, the reproducing target characteristic information generating unit 210 may select only music data not reproduced once within the last week to generate reproducing target characteristic information.

The reproducing order setting unit 212 includes a correlation distance calculating unit 214 and a similar data selecting unit 216. The reproducing order setting unit 212 selects music data which the user may wish to reproduce in the predetermined situation, based on the reproduction characteristic information regarding a predetermined situation, which is generated by the reproduction characteristic information generating unit 208, and the reproducing target characteristic information generated by the reproduction characteristic information generating unit 210, and sets a reproducing order so that the selected music data can be preferentially reproduced.

The correlation distance calculating unit 214 calculates correlation information indicating a correlation between the reproduction characteristic information generated by the reproduction characteristic information generating unit 208 and the reproducing target characteristic information generated by the reproducing target characteristic information generating unit 210.

The correlation information can be calculated by, for example, a method of Jensen-Shannon relative entropy for calculating a distance between clusters based on cluster attributes (characteristics). This is a method which is an expansion of Kullback-Leibler relative entropy. According to Jensen-Shannon relative entropy, a distance JS $(P_1 \| P_2)$ between clusters $C_1$ and $C_2$ is obtained by the following Equations (3) to (5) where $P_1$ and $P_2$ are probability distributions of the clusters $C_1$ and $C_2$, and $P(C_1)$ is a probability of $C_1$ among all events.

[Equation 3]

$$KL(P_1 \| P_2) = \sum_{j=1}^{n} P_{1j} \log \frac{P_{1j}}{P_{2j}} \quad (3)$$

$$\hat{P} = \frac{P(C_1)}{P(C_1) + P(C_2)} P_1 + \frac{P(C_2)}{P(C_1) + P(C_2)} P_2 \quad (4)$$

$$JS(P_1 \| P_2) = \frac{P(C_1)}{P(C_1) + P(C_2)} KL(P_1 \| \hat{P}) + \frac{P(C_1)}{P(C_1) + P(C_2)} KL(P_2 \| \hat{P}) \quad (5)$$

Figure 8:
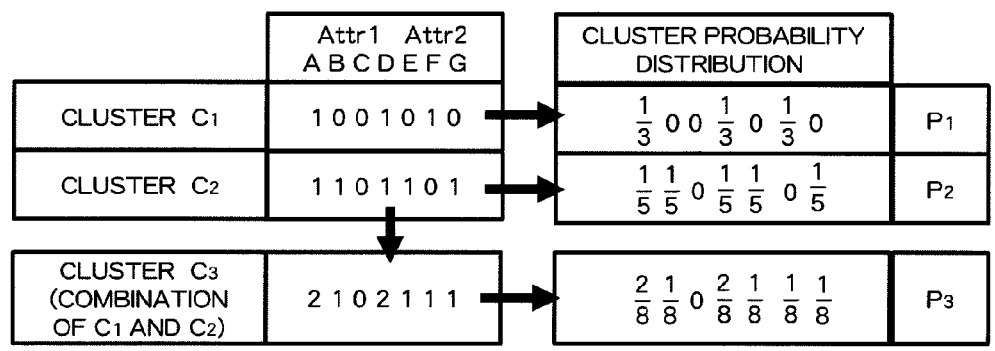
FIG. 8 is a diagram illustrating an example of a definition of a cluster probability distribution.

FIG. 8 is a diagram illustrating an example of a definition of a cluster probability distribution. As shown in this diagram, a cluster probability distribution is set based on a value obtained by dividing each attribute value of a cluster by the number of attributes. A cluster probability distribution generated by combining two or more clusters is set based on a value obtained by dividing a sum of attribute values for each attribute by the number of attributes.

The aforementioned method can be applied to calculation of a correlation distance in the correlation distance calculating unit 214 by setting correspondence between music data and clusters and between characteristic information of the music data and attribute values of the clusters. In this case, as a distance between the clusters calculated by the correlation distance calculating unit 214 is shorter, characteristics of both music data are judged to be similar.

Based on the distance between a plurality of clusters calculated by the correlation distance calculating unit 214, the similar data selecting unit 216 selects reproducing target characteristic information whose distance from reproduction characteristic information is the shortest, and selects one or a plurality of music data corresponding to the reproducing target characteristic information. In other words, the similar data selecting unit 216 selects music data whose musical characteristics are most similar to reproduction characteristic information for a predetermined situation. For example, when data ID read by the identification information reading unit 204 concerns music reproduced most recently, music data selected by the similar data selecting unit 216 is suited to a current situation.

The reproducing order setting unit 212 updates the reproducing order list 218 based on the data ID of the music data selected by the similar data selecting unit 216. In order to realize a recommended shuffle reproduction function, one or the plurality of data ID selected by the similar data selecting unit 216 is preferably added to a head or near the head of the reproducing order list 218. The reproducing order setting unit 212 preferably selects, according to presence or absence of reproduction at and after a predetermined time, for example, only music data not reproduced once within the last week, to set a reproducing order.

The reproduction controlling unit 200 refers to the reproducing order list 218 at a time such as immediately before or after switching music to be reproduced or immediately after updating the reproduction history storing unit 202. The reproduction controlling unit 200 sequentially obtains, according to an order of the data ID in the reproducing order list 218 referred to, items of path information of corresponding music data from the data managing unit 206, and reads the music data from the data storing unit 104 based on the items of path information to transfer the music data to the reproducing unit 108 via the bus 116.

Figure 9:
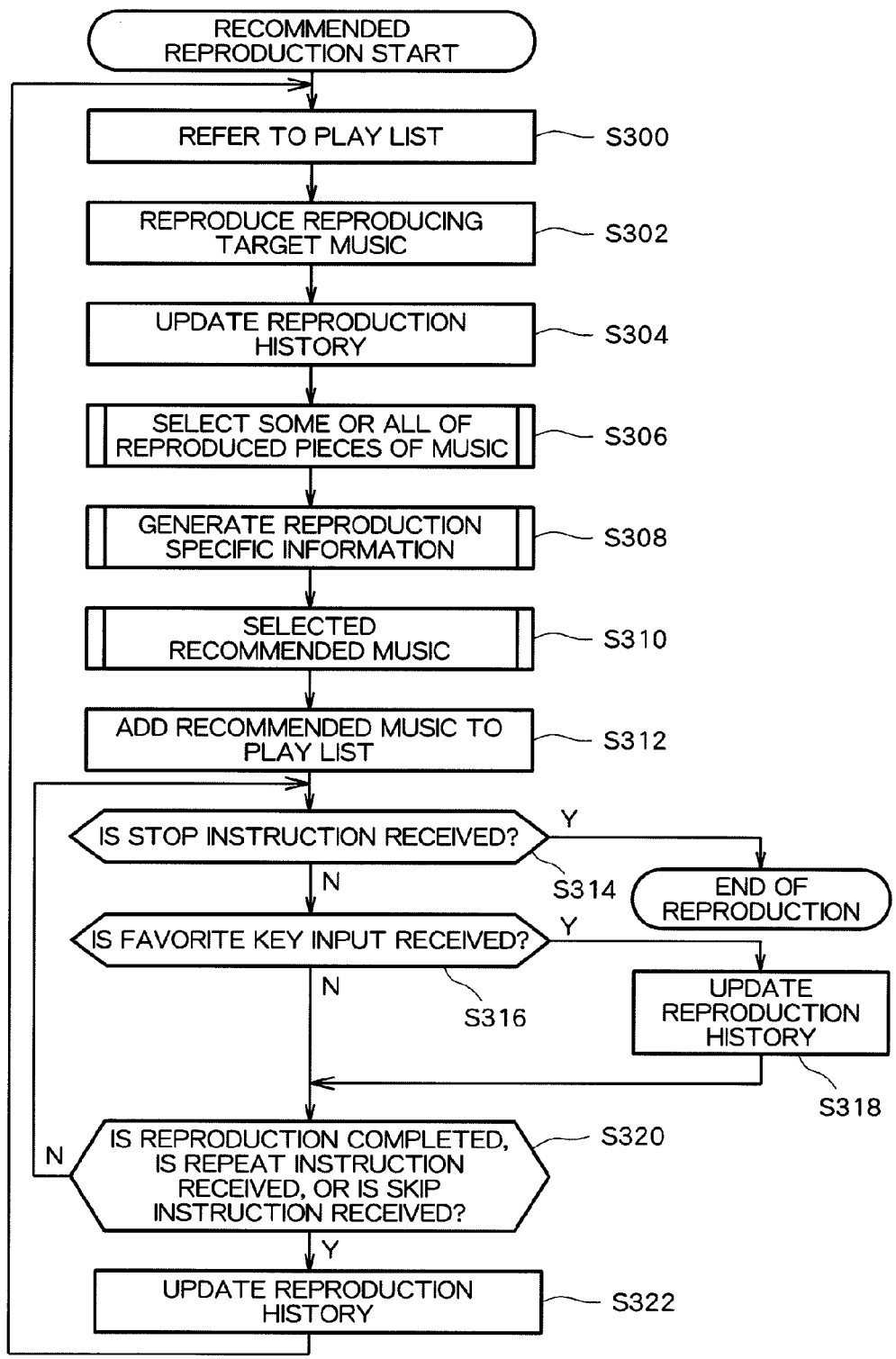
FIG. 9 is a flowchart illustrating an example of a processing procedure of recommended shuffle reproduction.
Figure 10:
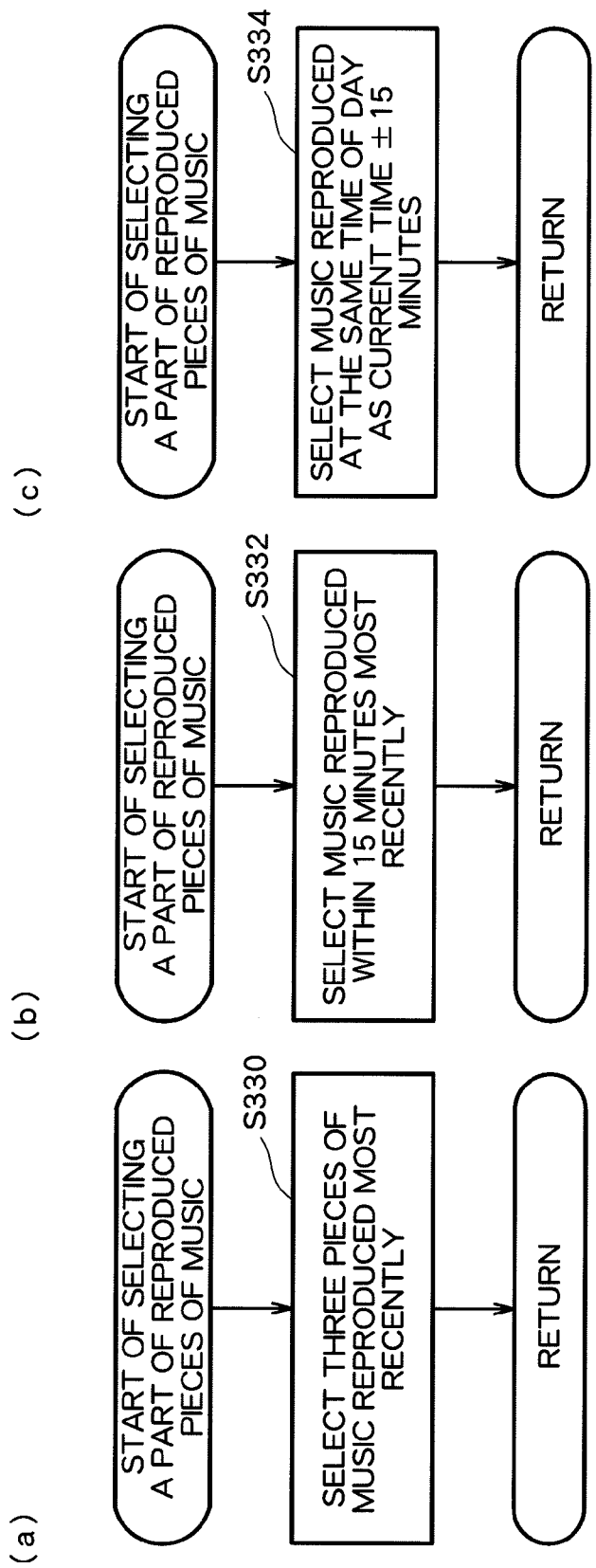
FIGS. 10A to 10C are flowcharts illustrating examples of processing procedures of selecting some or all pieces of music from pieces of reproduced music.

Hereinafter, referring to FIGS. 9 to 11, an example of a processing procedure for recommended shuffle reproduction will be described. This process is started when the user enters an instruction to start the recommended shuffle reproduction via the operating unit 100.

The reproduction controlling unit 200 refers to the reproducing order list 218 to read data ID in a head line of the reproducing order list 218 (S300). Then, based on the read data ID, the reproduction controlling unit 200 obtains path information to a corresponding music data file from the data managing unit 206, and transfers music data read from the data storing unit 104 based on the path information to the reproducing unit 108 via the bus 116 to start reproduction of reproducing target music data (S302).

The reproduction controlling unit 200 instructs the reproducing unit 108 to reproduce the music data, and simultaneously stores data ID of the music data whose reproduction is started in the reproduction history storing unit 202 (S304). The reproduction history storing unit 202 may store only data ID as shown in FIG. 5A, or reproduction start time in association with the data ID as shown in FIG. 5B.

Figure 12:
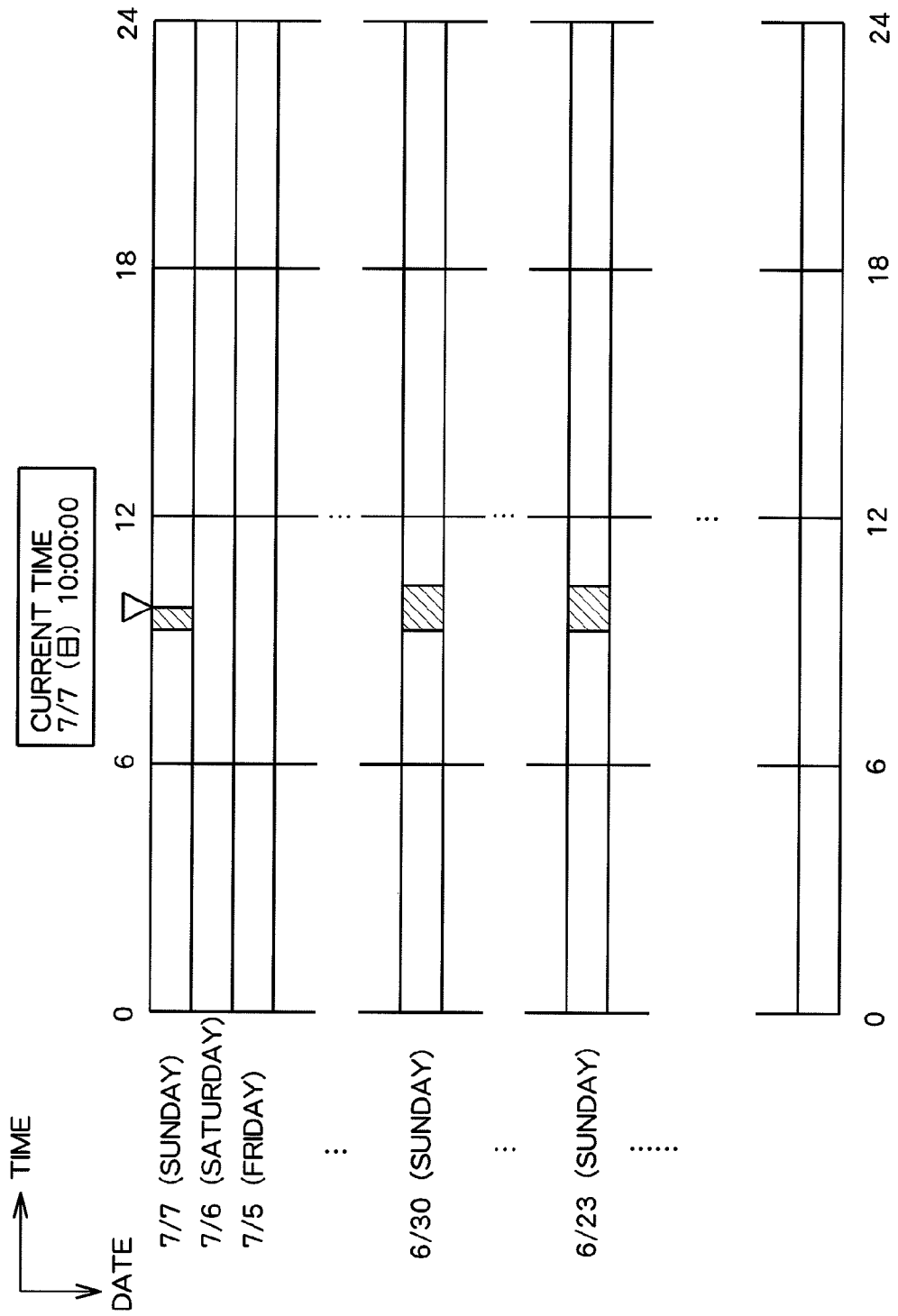
FIG. 12 is a conceptual diagram illustrating a state of selecting music reproduced at the same time of day as the present time of day.

Next, a process of selecting recommended music is started. The identification information reading unit 204 reads data ID of some or all of pieces of music data reproduced in a current situation from the reproduction history storing unit 202 (S306). For example, the music data reproduced in the current situation are selected by a procedure shown in each of FIGS. 10A to 10C. In other words, as shown in FIG. 10A, the upper five pieces of music are selected as music reproduced most recently from the reproduction history shown in FIG. 5A (S330). As shown in FIG. 10B, music whose reproduction start time is within 15 minutes from the current time may be selected as music reproduced most recently from the reproduction history shown in FIG. 5B (S332). As shown in FIG. 10C, music reproduced on the same day and at a time of day of 15 minutes before or after the current time may be selected as music reproduced most recently or music reproduced under the same environment from the reproduction history shown in FIG. 5B (S334). FIG. 12 is a conceptual diagram illustrating a state of selecting music reproduced on the same day of the week as today, and at the same time of day.

Next, the reproduction characteristic information generating unit 208 obtains, based on the data ID read by the identification information reading unit 204 in Step S306, characteristic information of corresponding music data from the data managing unit 206, and combines a plurality of items of characteristic information to generate an item of reproduction characteristic information by the aforementioned method (S308).

The reproducing order setting unit 212 selects, based on the reproduction characteristic information generated by the reproduction characteristic information generating unit 208 and the reproducing target characteristic information generated by the reproducing target characteristic information generating unit 210, recommended music data (S310) to set a reproducing order of the music data.

Figure 11:
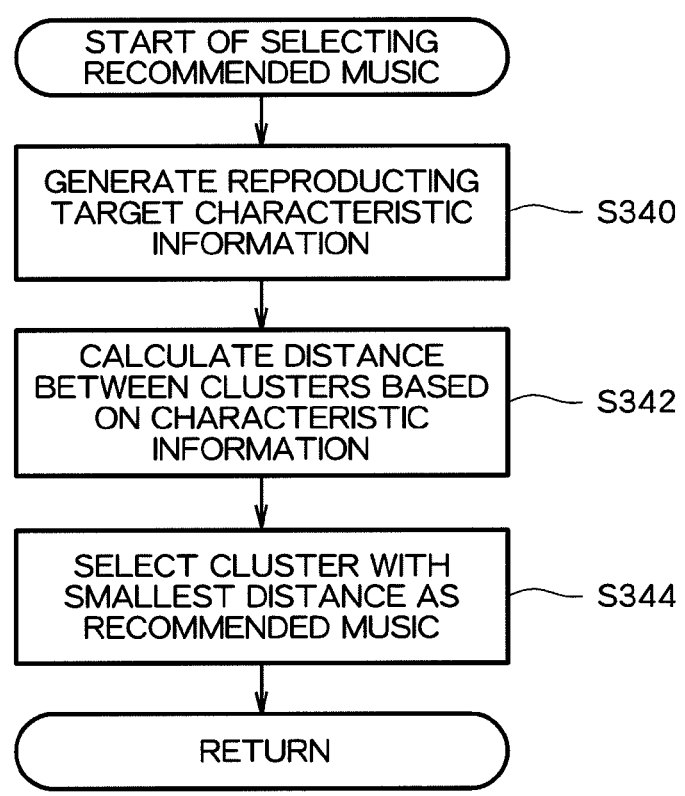
FIG. 11 is a flowchart illustrating an example of a processing procedure of selecting recommended music.

FIG. 11 is a flowchart illustrating a processing procedure of selecting the recommended music in Step S310. The reproducing target characteristic information generating unit 210 obtains, based on data ID of some or all of pieces of the data stored in the data storing unit 104, corresponding characteristic information from the data managing unit 206 to generate reproducing target characteristic information (S340). Then, the correlation distance calculating unit 214 calculates a distance indicating a correlation between the reproduction characteristic information generated by the reproduction characteristic information generating unit 208 and the reproducing target characteristic information generated by the reproducing target characteristic information generating unit 210 by using the method of Jensen-Shannon relative entropy or the like (S342). The process of Steps S340 and S342 is repeated when necessary so that the reproducing target characteristic information generating unit 210 can generate a plurality of items of reproducing target characteristic information. The similar data selecting unit 216 selects, based on the distance between the plurality of clusters calculated in Step S342, reproducing target characteristic information whose distance from reproduction characteristic information is the shortest, and selects one or a plurality of music data corresponding to the reproducing target characteristic information as recommended music (S344).

The reproducing order setting unit 212 adds the data ID of the recommended music selected in Step S310 to the head of the reproducing order list 218 (S312).

When the user instructs reproduction stopping via the operating unit 100 during reproduction of the music data, the reproduction of the music data is finished (S314). When the user presses the favorite key of the operating unit 100 during reproduction of the music data (S316), a predetermined value is added to an evaluation value of the music data in the reproduction history (S318).

When currently reproduced music data is reproduced to the end, or the user enters an instruction to repeatedly reproduce the currently reproduced music data (S320), as in the case where the favorite key is pressed, a predetermined value is added to an evaluation value of the music data in the reproduction history (S322) to move to reproduction of the next piece of music (S300). Conversely, when currently reproduced music is skipped (S320), a predetermined value is subtracted from the evaluation value of the music data in the reproduction history (S322) to move to reproduction of the next piece of music (S300).

The timing of executing the process of selecting the recommended music to update the play list is not limited to immediately after the reproduction start of the music data. For example, the process may be executed at a time such as immediately after completion of the reproduction of the music data or immediately after skipping of the currently reproduced music.

Second Embodiment

Figure 13:
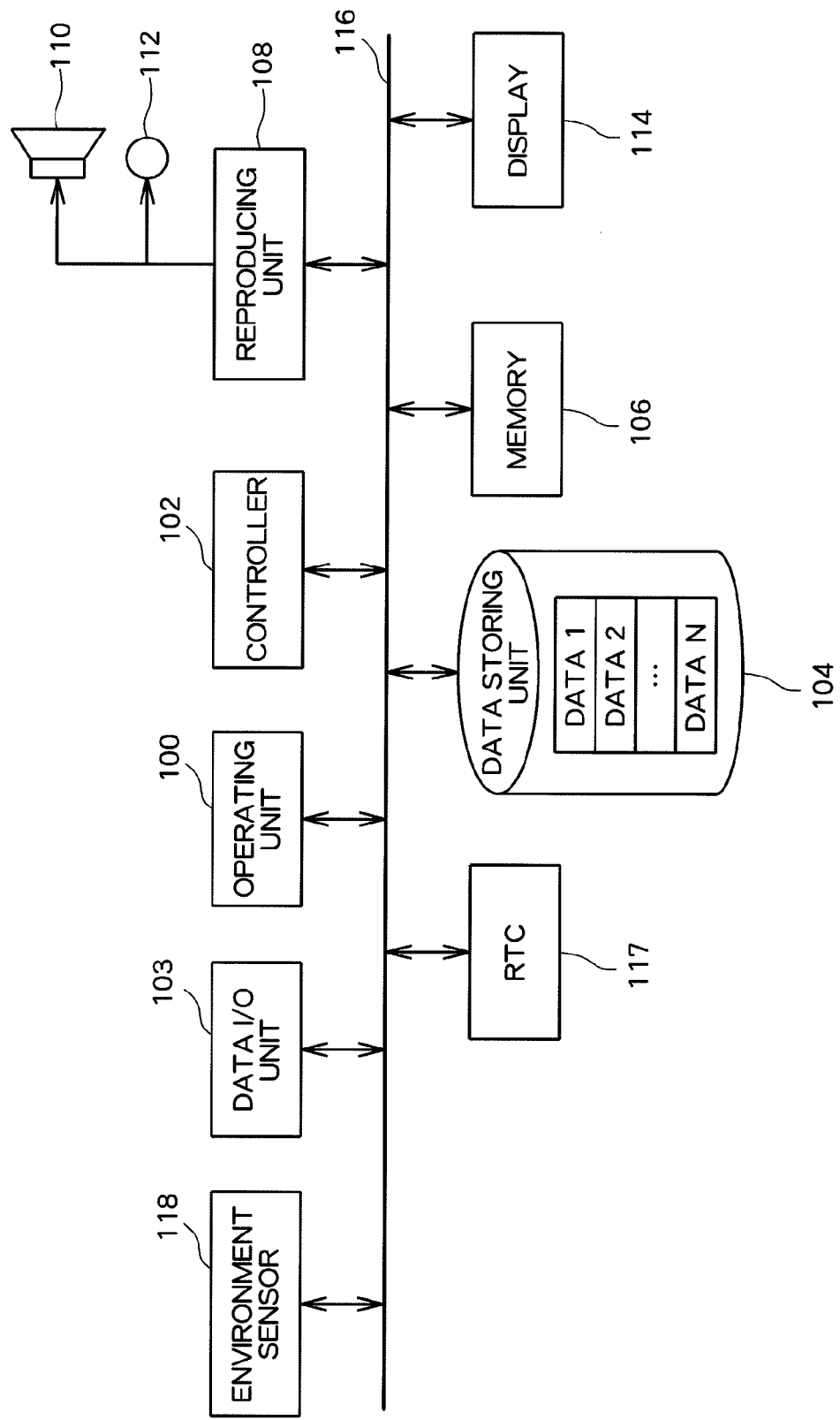
FIG. 13 is a diagram illustrating a configuration of a data reproducing apparatus according to a second embodiment of the present invention.
Figure 14:
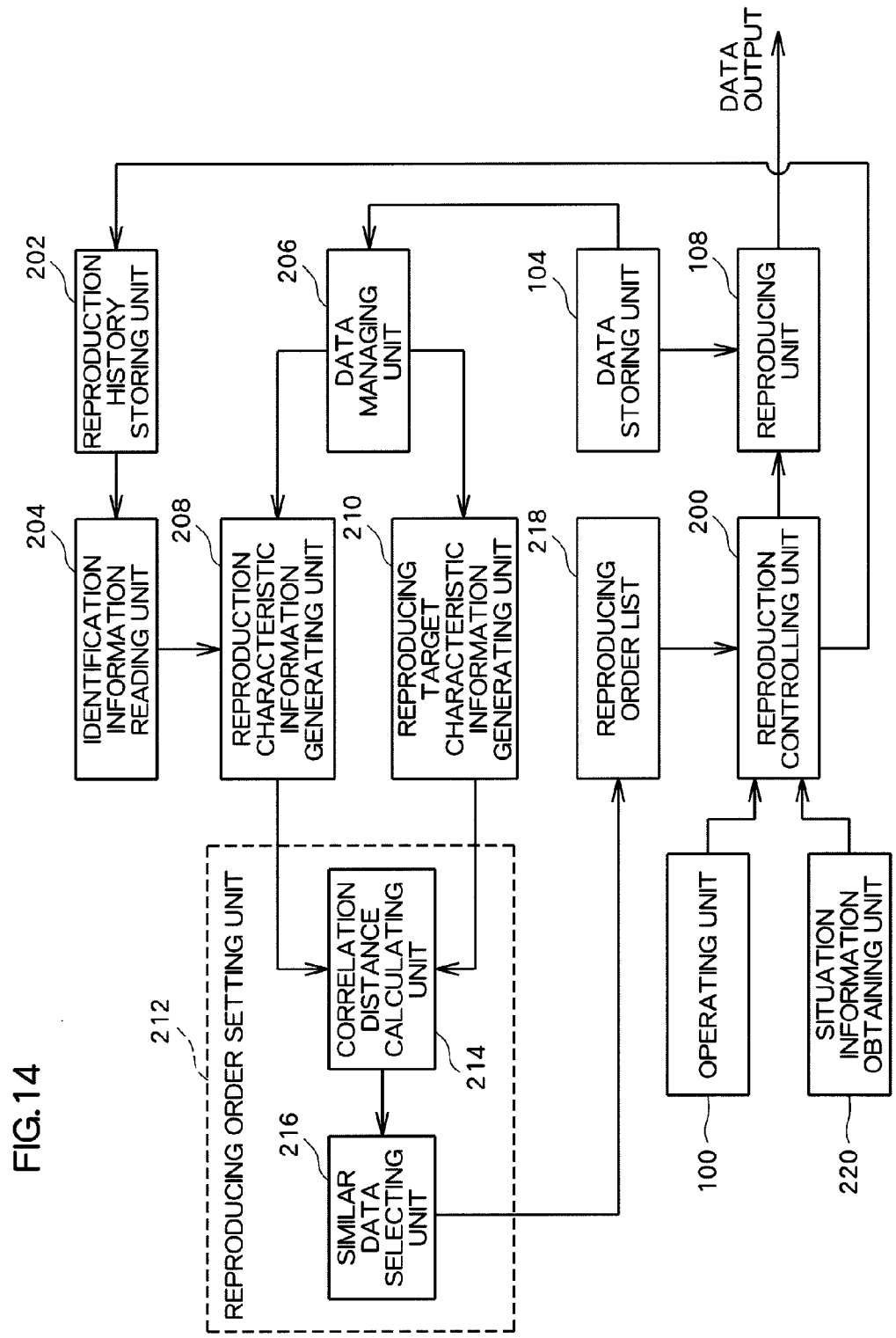
FIG. 14 is a block diagram of the data reproducing apparatus according to the second embodiment of the present invention.

FIG. 13 is a diagram illustrating a configuration of a data reproducing apparatus according to a second embodiment of the present invention. FIG. 14 is a block diagram illustrating the data reproducing apparatus according to the second embodiment of the present invention. Portions overlapping the portions of the first embodiment are denoted by the same reference numerals as the reference numerals of the first embodiment.

Hereinafter, description of the portions denoted by the same reference numerals as the reference numerals of the first embodiment is omitted, and different portions will be mainly described.

The music data reproducing apparatus of the second embodiment includes the operating unit 100, the controller 102, the data I/O unit 103, the data storing unit 104, the memory 106, the reproducing unit 108, the loudspeaker 110, the audio output terminal 112, the display 114, the bus 116, the RTC 117, and the environment sensor 118.

The environment sensor 118 obtains environment information around the music data reproducing apparatus. Taking an example of a case where the music data reproducing apparatus is a portable telephone or a car audio, communication means or information obtaining means for obtaining weather information, then an automobile wiper used for estimating rainfall, a global positioning system (GPS) or an acceleration sensor attached to a portable telephone or an automobile for measuring a position or a moving speed, or the like, corresponds to the environment sensor 118.

A situation information obtaining unit 220 obtains situation information indicating a situation at the moment based on raw environment information obtained by the environment sensor 118. The situation information is a combination of some items of information such as a time of day, weather, and a moving speed directly indicating a situation at the moment, for example, a combination of some items of information such as a time of day "evening", a weather "rainy", a temperature "hot", and a moving speed "high speed".

The reproduction controlling unit 200 instructs the reproducing unit 108 to reproduce music data, and simultaneously stores data ID of music data whose reproduction is started in the reproduction history storing unit 202. FIG. 15 is a diagram illustrating an example of reproduction history stored in the reproduction history storing unit 202. In the example of the drawing, the reproduction history sequentially stores data ID in the order of reproduction from the lower side, and reproduction start time of the music data and an evaluation value indicating user's preference for the music data in association with data ID.

The reproduction history storing unit 202 further stores, in addition to the reproduction history shown in FIG. 15, an accumulated evaluation value for each situation information indicating a situation during reproduction of the music data in association with data ID. FIG. 16 is a diagram illustrating an example of an accumulated evaluation value for each situation information. Reproduction history shown in this diagram is generated by adding, upon reproduction of music data, a value equivalent to the evaluation value of the reproduction history shown in FIG. 15 to an item of situation information corresponding to a situation where the music data is reproduced.

For example, in the reproduction history shown in FIG. 15, for music data of data ID: 0001 that started to be reproduced at 10:00:00, Jul. 7, 2005, an evaluation value is −1, and situation information at the moment when obtained by the situation information obtaining unit 220 is "time of day: morning, weather: fair, ... moving speed: medium speed." In this case, in the reproduction history shown in FIG. 16, −1 is added to an accumulated evaluation value of a part where data ID is 0001, a time of day is morning, weather is fair, ... and a moving speed is a medium speed. The accumulated evaluation value thus obtained for each situation information shown in FIG. 16 indicates evaluation for each situation during reproduction of the music data.

The reproduction characteristic information generating unit 208 obtains corresponding characteristic information from the data managing unit 206 based on a part of data ID read by the identification information reading unit 204. Then, based on a plurality of items of the obtained characteristic information, an item of reproduction characteristic information regarding a predetermined situation is generated.

In this case, the reproduction characteristic information generating unit 208 may select an item suited to a current situation among items of situation information associated with a part of the data ID read by the identification information reading unit 204, and weight and combine items of characteristic information to generate an item of reproduction characteristic information based on the accumulated evaluation value. In other words, reproduction characteristic information $C_T$ can be obtained by the following Equation (6) where $C_n$ is characteristic information of music data of n-th music, $b_n$, $c_n$, ..., $m_n$ are evaluation values of situation information indicating a current situation, and $W_b$, $W_c$, ..., $W_m$ (provided that $W_b+W_c+ \ldots +W_m=1$) are weight coefficients for methods of evaluating weather, moving speed or the like.

[Equation 4]

$$C_T = W_b \times (C_1 \times b_1 + C_2 \times b_2 + \ldots + C_n \times b_n) + \\ W_c \times (C_1 \times c_1 + C_2 \times c_2 + \ldots + C_n \times c_n) + \ldots + \\ W_m \times (C_1 \times m_1 + C_2 \times m_2 + \ldots + C_n \times m_n) \quad (6)$$

Each bracketed equation such as $C_1 \times b_1 + C_2 \times b_2 + \ldots + C_n \times b_n$ of Equation (6) indicates reproduction characteristic information of each evaluation method for weather, moving speed or the like, and may be normalized by division by a size $|C_1 \times b_1 + C_2 \times b_2 + \ldots + C_n \times b_n|$. For the evaluation values $b_n$, $c_n$, ..., $m_n$ of the situation information indicating the current situation, for example, if a time of day is "morning", a weather is "fair", and a moving speed is "medium speed", evaluation values of data ID corresponding to the current situation (morning, fair, and medium speed) are as shown in FIG. 17.

The reproduction characteristic information $C_T$ may be obtained, as represented by Equation (7), by combining together the reproduction characteristic information of the music data of the recently reproduced k pieces of music obtained by Equation (2) and the reproduction characteristic information obtained by Equation (6) regarding the current situation with arbitrary weights.

[Equation 5]

$$C_T = W_a \times (C_1 \times a_1 + C_2 \times a_2 + \ldots + C_k \times a_k) + \\ W_b \times (C_1 \times b_1 + C_2 \times b_2 + \ldots + C_n \times b_n) + \\ W_c \times (C_1 \times c_1 + C_2 \times c_2 + \ldots + C_n \times c_n) \ldots + \\ W_m \times (C_1 \times m_1 + C_2 \times m_2 + \ldots + C_n \times m_n) \quad (7)$$

The reproduction characteristic information thus generated indicates characteristics of music data reproduced in the current situation (morning, fair, and medium speed) (music reproduced under the same environment). In other words, the reproduction characteristic information generated based on the characteristic information of the music reproduced under the same environment indicates characteristics of music data suited to the current situation for the user.

Description of a processing procedure and a configuration at the time of generation of the reproduction characteristic information by the reproduction characteristic information generating unit 208 and thereafter is omitted because it is similar to the description of the first embodiment.

According to the music data reproducing apparatus described above, when a plurality of items of data are sequentially read from the data storing means which stores the data to be reproduced, without needing any complex operation, music data suited to a user's mood at the moment or a situation can be selected to be reproduced.

Note that the present invention is not limited to the embodiments described above.

For example, the reproduction history storing unit 208, the data managing unit 206, and the reproducing order list 218 are included in the memory 106. However, those units may be included in the data storing unit 104. The memory 106 and the data storing unit 104 may be similar in configuration. In other words, a function of the memory 106 may be provided in the data storing unit 104.

In the aforementioned processing procedure, there is given an example where the process of selecting the recommended music to update the play list is carried cut immediately after the reproduction start of the music data. However, the time of executing this process is not limited to immediately after the reproduction start.

Further, the present invention is not limited to the reproduction of music data, but may be applied to other data, for example, reproducible data such as audio data, moving image data, static image data, and character data.

The invention claimed is:

1. A data reproducing apparatus including reproducing means for sequentially reading and reproducing a plurality of items of data from data storing means which stores the data, comprising:
   situation information obtaining means for selecting an item of situation information from a plurality of items of situation information, wherein each item of situation information indicates a situation during reproduction of the data based on a current environment information;
   reproduction history storing means for storing reproduction history containing identification information of data at least a part of which has been reproduced by the reproducing means,
   wherein the reproduction history contains an evaluation value for each item of the situation information in association with each item of the identification information;
   identification information reading means for reading the identification information of some or all of the data reproduced in a situation indicated by the selected situation information from the reproduction history storing means;
   reproduction characteristic information generating means for weighting and combining characteristic information of data identified by the identification information read by the identification information reading means so as to generate reproduction characteristic information based on the evaluation value for the selected item of the situation information associated with the identification information read from the identification information reading means;
   the characteristic information of the data which indicates musical characteristics of the data; and
   reproducing order setting means for setting a reproducing order of reading and reproducing the data from the data storing means by the reproducing means based on the reproduction characteristic information generated by the reproduction characteristic information generating means and characteristic information of some or all of the data stored in the data storing means.

2. The data reproducing apparatus according to claim 1, wherein the identification information reading means reads the identification information of some or all of data reproduced in a current situation from the reproduction history storing means.

3. The data reproducing apparatus according to claim 2, wherein:
   the reproduction history further contains time information regarding reproduction of the data for each item, of the identification information; and
   the identification information reading means reads the identification information of some or all of the data reproduced in the current situation from the reproduction history storing means based on current time.

4. The data reproducing apparatus according to claim 2, wherein the identification information reading means reads identification information of some or all of the data reproduced in the current situation from the reproduction history storing means based on the reproducing order of the data identified by the identification information contained in the reproduction history.

5. The data reproducing apparatus according to claim 1, wherein the evaluation value is set based on a reproduction state of the data identified by the characteristic information read by the characteristic information reading means.

6. The data reproducing apparatus according to claim 5, wherein the evaluation value is set based on whether reproduction of the data identified by the characteristic information read by the characteristic information reading means has been completed.

7. The data reproducing apparatus according to claim 5, wherein the evaluation value is set based on whether reproduction of the data identified by the characteristic information read by the characteristic information reading means has been repeated.

8. The data reproducing apparatus according to claim 5, wherein the evaluation value is set based on whether reproduction of the data identified by the characteristic information read by the characteristic information reading means has been skipped midway.

9. The data reproducing apparatus according to claim 1, further comprising operating means for detecting a predetermined priority setting operation for a specific piece of the data from a user, and
   wherein the evaluation value is set according to whether the operating means has detected the priority setting operation from the user.

10. The data reproducing apparatus according to claim 9, wherein the specific piece of the data is data currently being reproduced by the reproducing means.

11. The data reproducing apparatus according to claim 1, wherein the reproducing order setting means obtains predetermined correlation information indicating a correlation between the reproduction characteristic information generated by the reproduction characteristic information generating means and characteristic information of some or all of the data stored in the data storing means, and sets the reproducing order of the data based on the correlation information.

12. The data reproducing apparatus according to claim 1, wherein the reproducing order setting means sets the reproducing order of the data selected according to a presence or absence of reproduction at and after a predetermined time.

13. A data reproducing method including a reproducing step of sequentially reading and reproducing a plurality of items of data from data storing means which stores the data, the data reproducing method comprising:
- a step of controlling reproduction history storing means to store reproduction history containing identification information of data at least a part of which has been reproduced in the reproducing step;
- situation information obtaining step of selecting an item of situation information from a plurality of items of situation information,
- wherein each item of situation information indicates a situation during reproduction of the data based on a current environment information, and
- wherein the reproduction history contains an evaluation value for each item of the situation information in association with each item of the identification information;
- an identification information reading step of reading the identification information of some or all of the data reproduced in a situation indicated by the selected situation information from the reproduction history storing means;
- a reproduction characteristic information generating step of weighting and combining characteristic information of data identified by the identification information read in the identification information reading step so as to generate reproduction characteristic information based on the evaluation value for the selected item of the situation information associated with the read identification information;
- the characteristic information of the data which indicates musical characteristics of the data; and
- a reproducing order setting step of setting a reproducing order of reading and reproducing the data from the data storing means in the reproducing step based on the reproduction characteristic information generated in the reproduction characteristic information generating step and characteristic information of some or all of the data stored in the data storing means.

14. A non-transitory computer-readable information storing medium for storing a program for controlling a computer to function as a data reproducing apparatus including reproducing means for sequentially reading and reproducing a plurality of items of data from data storing means which stores the data,
- the computer-readable information storing medium storing a program for controlling the computer to function as:
- situation information obtaining means for selecting an item of situation information from a plurality of items of situation information, wherein each item of situation information indicates a situation during reproduction of the data based on a current environment information;
- reproduction history storing means for storing reproduction history containing identification information of data at least a part of which has been reproduced by the reproducing means, wherein the reproduction history contains an evaluation value for each item of the situation information in association with each item of the identification information;
- identification information reading means for reading the identification information of some or all of the data reproduced in a situation indicated by the selected situation information from the reproduction history storing means;
- reproduction characteristic information generating means for weighting and combining characteristic information of data identified by the identification information read by the identification information reading means so as to generate reproduction characteristic information based on the evaluation value for the selected item of the situation information associated with the identification information read from the identification information reading means;
- the characteristic information of the data which indicates musical characteristics of the data; and
- reproducing order setting means for setting a reproducing order of reading and reproducing the data from the data storing means by the reproducing means based on the reproduction characteristic information generated by the reproduction characteristic information generating means and the characteristic information of some or all of the data stored in the data storing means.

* * * * *